United States Patent
Park et al.

(10) Patent No.: US 11,930,526 B2
(45) Date of Patent: Mar. 12, 2024

(54) METHOD AND APPARATUS FOR TRANSMITTING DATA USING RANDOM ACCESS PROCEDURE IN COMMUNICATION SYSTEM

(71) Applicant: ELECTRONICS AND TELECOMMUNICATIONS RESEARCH INSTITUTE, Daejeon (KR)

(72) Inventors: Ok Sun Park, Daejeon (KR); Seok Ki Kim, Daejeon (KR); Gi Yoon Park, Daejeon (KR); Eun Jeong Shin, Daejeon (KR); Jae Sheung Shin, Sejong-si (KR); Jin Ho Choi, Vic (AU)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 262 days.

(21) Appl. No.: 17/354,144

(22) Filed: Jun. 22, 2021

(65) Prior Publication Data

US 2022/0078840 A1 Mar. 10, 2022

(30) Foreign Application Priority Data

Sep. 4, 2020 (KR) ........................ 10-2020-0112941

(51) Int. Cl.
*H04W 74/00* (2009.01)
*H04W 72/21* (2023.01)
*H04W 74/08* (2009.01)

(52) U.S. Cl.
CPC ......... *H04W 74/004* (2013.01); *H04W 72/21* (2023.01); *H04W 74/0833* (2013.01)

(58) Field of Classification Search
CPC ............... H04W 74/004; H04W 72/21; H04W 74/0833; H04W 74/0841; H04W 72/1268; H04W 74/006
See application file for complete search history.

(56) References Cited

U.S. PATENT DOCUMENTS

| 10,548,168 | B2 | 1/2020 | Park et al. |
| 2019/0373645 | A1 | 12/2019 | Babaei et al. |
| 2019/0387548 | A1 | 12/2019 | Kim |

(Continued)

OTHER PUBLICATIONS

"3rd Generation Partnership Project; Technical Specification Group Radio Access Network; NR; Medium Access Control (MAC) protocol specification(Release 16)", #GPP TS 38.321 V16.0.0 (Mar. 2020).

(Continued)

*Primary Examiner* — Habte Mered
(74) *Attorney, Agent, or Firm* — LRK PATENT LAW FIRM

(57) ABSTRACT

Disclosed are methods and apparatuses for transmitting data using a random access procedure in a communication system. An operation method of a terminal in a communication system includes transmitting a first MsgA including an RA preamble #i and a payload to a base station; receiving, from the base station, a MsgB including information indicating that an RA preamble #k is reserved; and transmitting a second MsgA including the RA preamble #k and data to the base station in a preamble reservation period associated with the RA preamble #k.

17 Claims, 10 Drawing Sheets

(56) References Cited

U.S. PATENT DOCUMENTS

| | | |
|---|---|---|
| 2020/0053791 A1 | 2/2020 | Ozturk et al. |
| 2020/0120718 A1 | 4/2020 | Tirronen et al. |
| 2020/0236707 A1 | 7/2020 | Jose et al. |
| 2020/0260485 A1 | 8/2020 | Lei et al. |
| 2020/0260495 A1 | 8/2020 | Kim et al. |
| 2020/0267772 A1* | 8/2020 | Jung ............... H04W 72/21 |
| 2021/0029744 A1* | 1/2021 | Bae ............... H04W 74/0833 |
| 2021/0185733 A1* | 6/2021 | Agiwal ............ H04W 76/11 |
| 2022/0256620 A1* | 8/2022 | Lu ............... H04W 74/0866 |
| 2022/0377801 A1* | 11/2022 | Lei ............... H04W 74/006 |

OTHER PUBLICATIONS

Jinho Choi, "Fast Retrial for Low-Latency Connectivity in MTC with Two Different Types of Devices", IEEE Wireless Communications Letters; ;PP;99;10.1109/LWC.2020.3004822, NPL-01.

* cited by examiner

METHOD AND APPARATUS FOR TRANSMITTING DATA USING RANDOM ACCESS PROCEDURE IN COMMUNICATION SYSTEM

CROSS-REFERENCE TO RELATED APPLICATION(S)

This application claims priority to Korean Patent Application No. 10-2020-0112941 filed on Sep. 4, 2020 with the Korean Intellectual Property Office (KIPO), the entire content of which is hereby incorporated by reference.

BACKGROUND

1. Technical Field

The present disclosure relates to a technique for transmitting and receiving data in a communication system, and more specifically, to a technique for transmitting and receiving intermittent data by using a random access procedure.

2. Description of Related Art

With the development of information and communication technologies, various wireless communication technologies are being developed. Representative wireless communication technologies include long term evolution (LTE), new radio (NR), or the like defined as the 3rd generation partnership project (3GPP) specifications. The LTE may be one of 4th generation (4G) wireless communication technologies, and the NR may be one of 5th generation (5G) wireless communication technologies.

After commercialization of 4G communication systems (e.g., communication systems supporting the LTE), 5G communication systems (e.g., communication systems supporting the NR) using a higher frequency band (e.g., a frequency band of 6 GHz or above) than a frequency band (e.g., a frequency band of 6 GHz or below) of the 4G communication systems are being considered for processing of soaring wireless data. The 5G communication systems may support enhanced Mobile BroadBand (eMBB), Ultra Reliable Low Latency Communication (URLLC), and Massive Machine Type Communication (mMTC).

Meanwhile, in the 5G communication system, the number of MTC terminals (e.g., terminals supporting URLLC or mMTC) is increasing, and the MTC terminal may perform communication based on URLLC requirements. In particular, the MTC terminals may exist in a factory automation system (e.g., a wireless factory automation system based on cellular communication). The factory automation system can support monitoring production process functions, real-time control functions, ultra-precise motion control functions for production robots, remote robot control functions, tracking functions of equipment and products, and the like.

The MTC terminal may be located in a sensor and/or an actuator in the factory automation system. For example, the MTC terminal may transmit a measurement result of the sensor. In addition, the MTC terminal may control operations of the actuator based on control commands received from a base station. In this case, the MTC terminal may transmit intermittent data based on the URLLC requirements. The intermittent data may be transmitted through a random access procedure, and in this case, intermittent data transmission methods satisfying the URLLC requirements are required.

SUMMARY

Accordingly, exemplary embodiments of the present disclosure are directed to providing methods and apparatuses for transmitting and receiving intermittent data by using a random access procedure.

According to a first exemplary embodiment of the present disclosure, an operation method of a terminal in a communication system may comprise: transmitting a first MsgA including a random access (RA) preamble #i and a payload to a base station; receiving, from the base station, a MsgB including information indicating that an RA preamble #k is reserved; and transmitting a second MsgA including the RA preamble #k and data to the base station in a preamble reservation period associated with the RA preamble #k, wherein each of i and j is a natural number.

When i is equal to k, the data may be transmitted on a physical uplink shared channel (PUSCH) occasion associated with the RA preamble #i selected by the terminal.

When i is different from k, the data may be transmitted on a PUSCH occasion associated with the RA preamble #k selected by the base station.

The RA preamble #i and the RA preamble #k may belong to a group A1 among the group A1 and a group A2, RA preambles belonging to the group A1 may be used for transmission of delay-sensitive data, and RA preambles belonging to the group A2 may be used for transmission of delay-tolerant data.

One of configuration information of the group A1 and configuration information of the group A2 may be included in random access channel (RACH) configuration information received from the base station, the configuration information of the group A1 may indicate one or more of a number and indices of the RA preambles belonging to the group A1, and the configuration information of the group A2 may indicate one or more of a number and indices of the RA preambles belonging to the group A2.

The number of RA preambles belonging to the group A1 may be determined based on a ratio of reserved RA preambles.

The MsgB may further include information indicating that the preamble reservation period is activated.

When the preamble reservation period ends, the reservation of the RA preamble #k may be released.

The second MsgA may be transmitted by the terminal operating in a radio resource control (RRC) idle state or RRC inactive state.

According to a second exemplary embodiment of the present disclosure, an operation method of a terminal in a communication system may comprise: receiving random access channel (RACH) configuration information from a base station; transmitting a first MsgA including a random access (RA) preamble #i selected based on the RACH configuration information and a payload to the base station; transmitting a second MsgA including an RA preamble #k selected based on the RACH configuration information and a payload to the base station; stopping repeated transmission operations of the MsgA when a MsgB including information indicating that an RA preamble #j is reserved is received within a response window; and transmitting a third MsgA including the RA preamble #j and a payload to the base station for a preamble reservation period associated with the RA preamble #j, wherein each of i, k, and j is a natural number.

The RACH configuration information may include configuration information of a group A1 to which the RA preamble #i, the RA preamble #k, and the RA preamble #j belong, the configuration information of the group A1 may indicate one or more of a number and indices of RA preambles belonging to the group A1, and the RA preambles belonging to the group A1 may be used for transmission of delay-sensitive data.

The number of the RA preambles belonging to the group A1 may be determined based on a ratio of reserved RA preambles.

When i is equal to j, the payload of the third MsgA may be transmitted on a physical uplink shared channel (PUSCH) occasion associated with the RA preamble #i selected by the terminal, and when k is equal to j, the payload of the third MsgA may be transmitted on a PUSCH occasion associated with the RA preamble #k selected by the terminal.

When i, k, and j are different from each other, the payload of the third MsgA may be transmitted on a PUSCH occasion associated with the RA preamble #j selected by the base station.

The MsgB may further include information indicating that the preamble reservation period is activated, and when the preamble reservation period ends, the reservation of the RA preamble #j may be released.

According to a third exemplary embodiment of the present disclosure, an operation method of a base station in a communication system may comprise: receiving a first MsgA including a random access (RA) preamble #i and a payload from a terminal; when the RA preamble #i belongs to a group A1 consisting of RA preambles used for data transmission, and the RA preamble #i is available, transmitting a MsgB including information indicating that the RA preamble #i is reserved to the terminal; and receiving a second MsgA including the RA preamble #i and data from the terminal in a preamble reservation period associated with the RA preamble #i, wherein i is a natural number.

The operation method may further comprise transmitting radio access channel (RACH) configuration information to the terminal, wherein the RACH configuration information includes configuration information of the group A1, which indicates one or more of a number and indices of RA preambles belonging to the group A1.

The number of the RA preambles belonging to the group A1 may be determined based on a ratio of reserved RA preambles.

The MsgB may further include information indicating that the preamble reservation period is activated, and when the preamble reservation period ends, the reservation of the RA preamble #i may be released.

The second MsgA may be received from the terminal operating in a radio resource control (RRC) idle state or RRC inactive state.

According to the exemplary embodiments of the present disclosure, a random access (RA) preamble used for transmission of data (e.g., delay-sensitive (DS) data) may be reserved in advance. When data occurs, the terminal may transmit a MsgA including the reserved RA preamble and the data to the base station. In addition, a terminal operating in a radio resource control (RRC) idle state or RRC inactive state may transmit the MsgA to the base station without transition of the operating state. Accordingly, the data transmission procedure can be performed quickly, and the performance of the communication system can be improved.

BRIEF DESCRIPTION OF DRAWINGS

Exemplary embodiments of the present disclosure will become more apparent by describing in detail embodiments of the present disclosure with reference to the accompanying drawings, in which.

Figure 1:
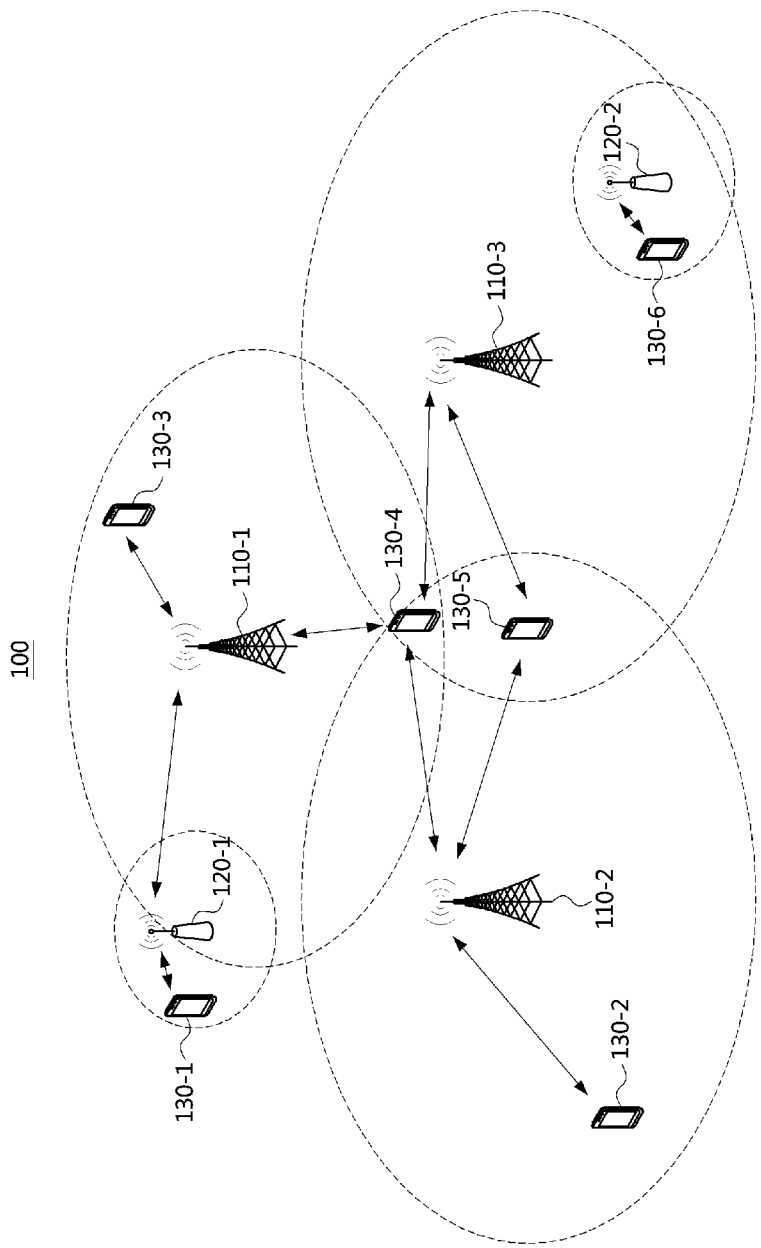
FIG. 1 is a conceptual diagram illustrating a first exemplary embodiment of a communication system.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication networks. Here, the communication system may be used in the same sense as a communication network.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4th generation (4G) communication (e.g., long term evolution (LTE), LTE-advanced (LTE-A)), 5th generation (5G) communication (e.g., new radio (NR)), or the like. The 4G communication may be performed in a frequency band of 6 gigahertz (GHz) or below, and the 5G communication may be performed in a frequency band of 6 GHz or above.

For example, for the 4G and 5G communications, the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like.

In addition, the communication system 100 may further include a core network. When the communication system 100 supports the 4G communication, the core network may comprise a serving gateway (S-GW), a packet data network (PDN) gateway (P-GW), a mobility management entity (MME), and the like. When the communication system 100 supports the 5G communication, the core network may comprise a user plane function (UPF), a session management function (SMF), an access and mobility management function (AMF), and the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
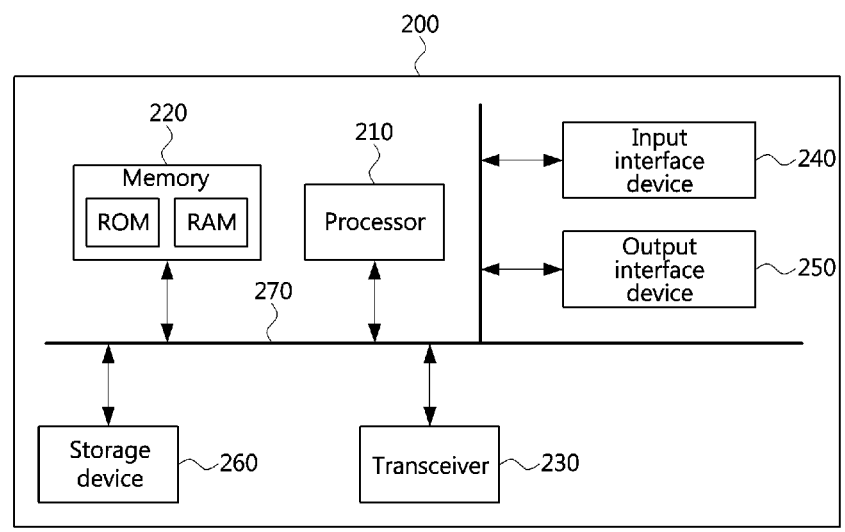
FIG. 2 is a block diagram illustrating a first exemplary embodiment of a communication node constituting a communication system.

FIG. 2 is a block diagram illustrating a first embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, a road side unit (RSU), a radio remote head (RRH), a transmission point (TP), a transmission and reception point (TRP), an eNB, a gNB, or the like.

Here, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, an Internet of things (IoT) device, a mounted apparatus (e.g., a mounted module/device/terminal or an on-board device/terminal, etc.), or the like.

Hereinafter, methods for transmitting and receiving data using a random access procedure will be described. The methods for transmitting and receiving data may be applied to a contention-free random access (CFRA) procedure or a contention-based random access (CBRA) procedure. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a transmitting terminal is described, a corresponding receiving terminal may perform an operation corresponding to the operation of the transmitting terminal. Conversely, when an operation of a receiving terminal is described, a corresponding transmitting terminal may perform an operation corresponding to the operation of the receiving terminal.

Figure 3:
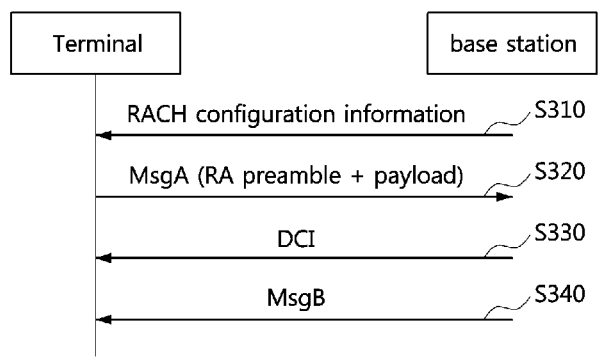
FIG. 3 is a sequence chart illustrating a first exemplary embodiment of a 2-step random access procedure.

FIG. 3 is a sequence chart illustrating a first exemplary embodiment of a 2-step random access procedure.

Referring to FIG. 3, a communication system may include a base station and a terminal. The base station may be the base station 110-1, 110-2, 110-3, 120-1, or 120-2 shown in FIG. 1, and the terminal may be the terminal 130-1, 130-2, 130-3, 130-4, 130-5, or 130-6 shown in FIG. 1. Each of the base station and the terminal may be configured identically or similarly to the communication node 200 shown in FIG. 2.

The base station may generate random access channel (RACH) configuration information and transmit the RACH configuration information (S310). The RACH configuration information may include RACH-ConfigCommon, RACH-ConfigCommonTwoStepRA, RACH-ConfigDedicated, RACH-ConfigGeneric, and/or RACH-ConfigGenericTwoStepRA. The RACH configuration information may be transmitted to the terminal through system information and/or a radio resource control (RRC) message.

The terminal may receive the RACH configuration information from the base station, and may identify information elements included in the RACH configuration information. The terminal may select one random access procedure among a 2-step random access procedure and a 4-step random access procedure. For example, when a quality of a signal (e.g., reference signal and/or synchronization signal) received from the base station exceeds a threshold indicated by the RACH configuration information, the terminal may select the 2-step random access procedure. On the other hand, when the quality of the signal received from the base station is less than or equal to the threshold indicated by the RACH configuration information, the terminal may select the 4-step random access procedure. Here, the reference signal may be a demodulation-reference signal (DM-RS), channel state information-reference signal (CSI-RS), and/or phase tracking-reference signal (PT-RS). The synchronization signal may be a primary synchronization signal (PSS), secondary synchronization signal (SSS), and/or synchronization signal/physical broadcast channel (SS/PBCH) block.

When the 2-step random access procedure is performed, the terminal may transmit a message A (MsgA) to the base station (S320). The MsgA may include a random access (RA) preamble and a payload. The RA preamble may be transmitted on a physical random access channel (PRACH) (e.g., PRACH occasion), and the payload may be transmitted on a physical uplink shared channel (PUSCH) (e.g., PUSCH occasion). The RA preamble may be transmitted in a PRACH occasion indicated by the RACH configuration information.

The base station may receive the MsgA from the terminal. The base station may generate downlink control information (DCI) including resource allocation information for transmission of a message B (MsgB), and may transmit the DCI on a physical downlink control channel (PDCCH) (S330). A cyclic redundancy check (CRC) of the DCI may be scrambled by a radio network temporary identifier (RNTI). The RNTI may be a cell (C)-RNTI or a MsgB-RNTI. The MsgB-RNTI may be determined based on a resource of the PRACH (e.g., PRACH occasion) on which the RA preamble is received. The base station may transmit the MsgB to the terminal in a resource (e.g., physical downlink shared channel (PDSCH)) indicated by the DCI (S340). The MsgB may include a fallbackRAR, successRAR, or backoff indicator (BI).

The terminal may perform a DCI monitoring operation using the RNTI (e.g., C-RNTI or MsgB-RNTI) in a response window. The response window may be indicated by msgB-ResponseWindow included in the RACH configuration information. The terminal may receive the DCI from the base station in the response window, and may receive the MsgB from the base station in the resource indicated by the DCI.

Figure 4:
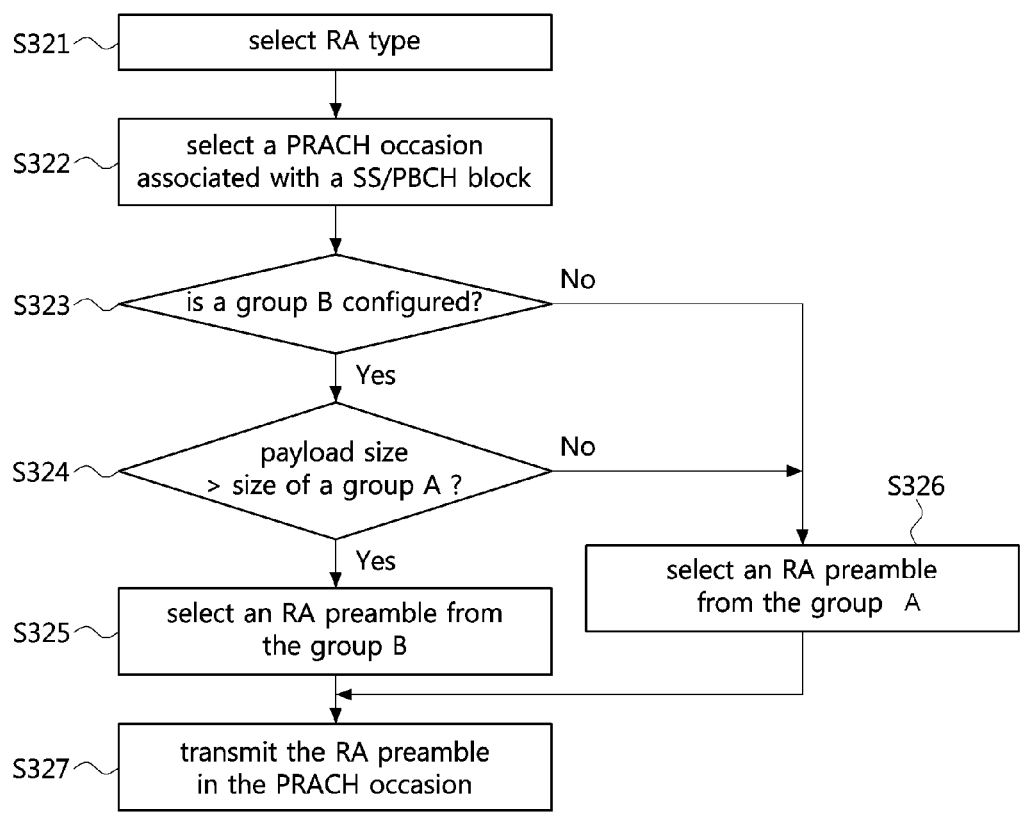
FIG. 4 is a sequence chart illustrating a first exemplary embodiment of detailed operations of the step S320 in the 2-step random access procedure.

Meanwhile, detailed operations of the step S320 may be performed as follows. FIG. 4 is a sequence chart illustrating a first exemplary embodiment of detailed operations of the step S320 in the 2-step random access procedure.

Referring to FIG. 4, the terminal may determine a random access (RA) type (S321). The RA type may be classified into the 2-step random access procedure and the 4-step random access procedure. The terminal may measure a quality of a signal (e.g., reference signal and/or synchronization signal) received from the base station, and when the quality of the signal exceeds a threshold (e.g., msgA-RSRP-Threshold) included in the RACH configuration information, the terminal may select the 2-step random access procedure. On the other hand, the terminal may select the 4-step random access procedure when the quality of the signal is less than or equal to the threshold.

Here, the quality of the signal may be a reference signal received power (RSRP). The RSRP may be defined as a linear average value compared to power distribution of resource elements (REs) through which the SSS is transmitted. Alternatively, the RSRP may be defined as a linear average value compared to power distribution in consideration of a power scaling of a PBCH DM-RS or CSI-RS. The PBCH DM-RS may be a DM-RS used for demodulation of the PBCH.

In the step S321, the 2-step random access procedure may be selected, and in the step S322, the terminal may select a PRACH occasion associated with a SS/PBCH block based on qualities of SS/PBCH block(s) received from the base station. For example, the terminal may select a SS/PBCH block having a signal quality exceeding a threshold (e.g., msgA-RSRP-ThresholdSSB) included in the RACH configuration information from among the SS/PBCH block(s), and may select a PRACH occasion associated with the selected SS/PBCH block.

Meanwhile, RA preambles may be classified into a group A and a group B. The RA preambles belonging to the group A may be used when the size of a transport block (TB) (e.g., the size of the payload of MsgA) is less than or equal to a threshold (e.g., ra-MsgA-SizeGroupA). The RA preambles belonging to the group B may be used when the size of the TB exceeds the threshold.

The terminal may determine whether the RACH configuration information includes configuration information of the group B (e.g., GroupB-ConfiguredTwoStepRA) (S323). When the RACH configuration information does not include the configuration information of the group B, the terminal may select an RA preamble from the group A (S326). The RA preamble may be randomly selected from the group A. When the RACH configuration information includes the configuration information of the group B, in the step S324, the terminal may compare the size of the payload of MsgA with a threshold (e.g., ra-MsgA-SizeGroupA) included in the RACH configuration information.

When the size of the payload of MsgA is equal to or less than the threshold, the terminal may select an RA preamble from the group A (S326). On the other hand, when the size of the payload of MsgA exceeds the threshold, the terminal may select an RA preamble from the group B (S325). The RA preamble may be randomly selected from the group B. The terminal may transmit the RA preamble selected in the step S325 or S326 to the base station in the PRACH occasion selected in the step S322 (S327). In addition, the terminal may transmit the payload to the base station in a PUSCH occasion associated with the RA preamble. A transmission power of the RA preamble may be controlled in consideration of preambleReceivedTargetPower, a power offset according to a preamble format, and/or a power offset according to the number of power ramping times. The preambleReceivedTargetPower may be included in RACH configuration information.

On the other hand, in the exemplary embodiments below, data may be classified into delay-sensitive (DS) data and delay-tolerant (DT) data according to quality of service (QoS) requirements (e.g., Ultra-Reliable and Low Latency Communication (URLLC) requirements). The DS data may be intermittent data transmitted by a Machine Type Communication (MTC) terminal based on the URLLC requirements. The data (e.g., DS data and/or DT data) may be transmitted in the 2-step random access procedure. An RA preamble for the DS data may be reserved in advance, and in the 2-step random access procedure, the DS data may be transmitted using the reserved RA preamble. The reserved RA preamble may be released according to a preconfigured scheme. When the reserved RA preamble is used, a transmission delay of the DS data may be reduced, and resources of the RA preamble may be used efficiently.

On the other hand, according to the existing scheme, the terminal may transmit a scheduling request (SR) for the DS data to the base station on a PUCCH after performing the random access procedure, receive an uplink (UL) grant from the base station, and transmit the DS data to the base station in a PUSCH indicated by the UL grant. In this case, a transmission delay of the DS data may increase. In addition, in a transmission procedure of DS data having a short length, a signaling overhead may be large compared to the length of the DS data. In the exemplary embodiments below, methods for transmitting/receiving DS data and/or DT data will be described, and the exemplary embodiments below may be used for transmission/reception of general data as well as the DS data and/or the DT data.

The DS data may be included in the payload of MsgA, and the payload of MsgA including the DS data may be transmitted on a PUSCH (e.g., PUSCH occasion). The size of the DS data may be defined so that the DS data is included in the payload of MsgA. The DS data may occur intermittently. Therefore, when the DS data is transmitted by performing an RRC connection establishment procedure after receiving a MsgB, a signaling overhead may increase. In the procedure for transmitting the DS data using the reserved RA preamble, a MsgB including a 'reservationRAR' may be defined. The MsgB including the reservationRAR may indicate that the RA preamble is reserved. When the MsgB including the reservationRAR is received, the terminal may transmit the DS data without performing an RRC connection establishment procedure. The length of the MsgB including the reservationRAR may be defined to be shorter than the length of the MsgB including the fallbackRAR or successRAR.

When the MsgA including the DS data (e.g., DS data having high URLLC requirements) is transmitted, the RA preamble of the corresponding MsgA may be reserved for a preconfigured time (e.g., CB_preamble reservation period). The reservation of the RA preamble may be maintained during the preconfigured time, and when the preconfigured time elapses, the reservation of the RA preamble may be released. The CB_preamble reservation period may be set as a multiple of a PRACH configuration period. The CB_preamble reservation period may be included in the RACH configuration information (e.g., RACH-ConfigCommonTwoStepRA).

Resources of the RA preamble associated with the payload (e.g., MsgA) including the DS data and resources of the RA preamble associated with the payload (e.g., MsgA) including the DT data may be independently managed. For example, the group A including a plurality of RA preambles may be classified into a group A1 and a group A2. The group A1 may include RA preambles for transmission of the DS data. The group A2 may include RA preambles for transmission of the DT data. The group A including RA preambles may be configured as follows.

Figure 5:
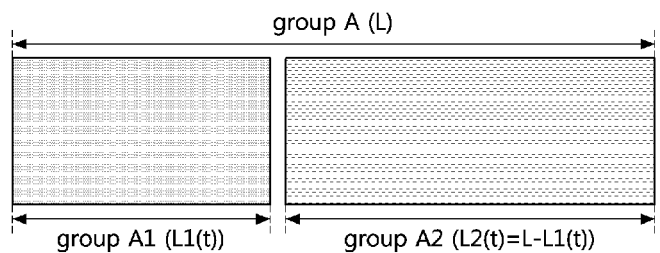
FIG. 5 is a conceptual diagram illustrating a structure of a group A including RA preambles.

FIG. 5 is a conceptual diagram illustrating a structure of a group A including RA preambles.

Referring to FIG. 5, there may be L RA preambles, and the L RA preambles may be orthogonal to each other. The group A1 may include L1(t) RA preambles at a time t, and the group A2 may include L2(t) RA preambles at the time t. Here, L2(t) may be (L−L1(t)). An RA preamble for transmission of DS data may be selected from the group A1. An RA preamble for transmission of DT data may be selected from the group A2. Indices of RA preambles belonging to the group A1 may be defined as in Equation 1 below, and indices of RA preambles belonging to the group A2 may be defined as in Equation 2 below.

$$A1=\{0, \ldots, L1(t)-1\} \qquad \text{[Equation 1]}$$

$$A2=\{L1(t), L1(t)+1, \ldots, L-1\} \qquad \text{[Equation 2]}$$

Configuration information of the group A1 and/or configuration information of the group A2 may be included in the RACH configuration information. Alternatively, the configuration information of the group A1 and/or the configuration information of the group A2 may be transmitted using one or more of a MAC message (e.g., MAC control element (CE)) and a PHY message (e.g., DCI). The configuration information of the group A1 may indicate the number and/or indices of RA preambles included in the group A1. For example, numberOfRA-PreamblesGroupA1 included in the RACH configuration information (e.g., RACH-ConfigCommonTwoStepRA) may indicate the number of the RA preambles included in the group A1. The numberOfRA-PreamblesGroupA1 may be set to one integer from 1 to 64. The configuration information of the group A2 may indicate the number and/or indices of RA preambles included in the group A2. For example, numberOfRA-PreamblesGroupA2 included in RACH configuration information (e.g., RACH-ConfigCommonTwoStepRA) may indicate the number of RA preambles included in the group A2. The numberOfRA-PreamblesGroupA2 may be set to one integer from 1 to 64.

The index of the RA preamble belonging to the group A1 may be mapped to a PUSCH occasion that satisfies high URLLC requirements. The payload of MsgA including the DS data may be transmitted in a PUSCH occasion mapped to the RA preamble belonging to the group A1. A frequency band of the PUSCH occasion that satisfies high URLLC requirements may be configured to be larger than a frequency band of other PUSCH occasions. The PUSCH occasions satisfying high URLLC requirements may be repeated in the time domain. A low modulation and coding scheme (MCS) level may be used in the PUSCH occasions that satisfy high URLLC requirements. A diversity scheme may be used for the PUSCH occasion that satisfies high URLLC requirements.

The base station may adjust L1(t) according to the number of occurrences of DS data. Accordingly, resources of RA preambles in the communication system may be used efficiently. For example, when a ratio of the number Q(t) of reserved RA preambles to the number L1(t) of RA preambles included in the group A1 for a time T exceeds a threshold a, the base station may increase L1(t) by ΔL. In this case, L1(t+1) at a time t+1 may be (L1(t)+ΔL), and L2(t+1) at the time t+1 may be (L−(L1(t)+ΔL)).

On the other hand, when the ratio of the number Q(t) of reserved RA preambles to the number L1(t) of RA preambles included in the group A1 for the time T is less than or equal to the threshold a, the base station may decrease L1(t) by ΔL. In this case, L1(t+1) at the time t+1 may be (L1(t)−ΔL), and L2(t+1) at the time t+1 may be (L−(L1(t)−ΔL)). That is, the base station may adjust the number of RA preambles included in the group A1 based on Equation 3 below. The base station may inform the terminal of information indicating the adjusted number of RA preambles belonging to the group A1 using one or more of system information, an RRC message, a MAC message, and a PHY message.

$$L_1(t+1) = L_1(t) + \Delta L, \text{ if } \int_0^T \frac{Q(t)}{L_1(t)} dt > \alpha \qquad \text{[Equation 3]}$$

$$L_1(t+1) = L_1(t) - \Delta L, \text{ otherwise}$$

Q(t) may indicate the number of reserved RA preambles among the RA preambles included in the group A1 at the time t. T may indicate a monitoring period. α may indicate a maximum ratio of the number of reserved RA preambles to the total number of RA preambles included in the group A1. ΔL may be an increasing offset or a decreasing offset with respect to the number of RA preambles. The parameters (e.g., L1(t), α, and/or ΔL) related to Equation 3 may be included in the RACH configuration information. For example, the numberOfRA-PreamblesGroupA1 included in the RACH configuration information (e.g., RACH-Config-CommonTwoStepRA) may indicate L1(t).

Meanwhile, when the group A1 and the group A2 are configured, the step S326 shown in FIG. 4 may be performed as follows.

Figure 6:
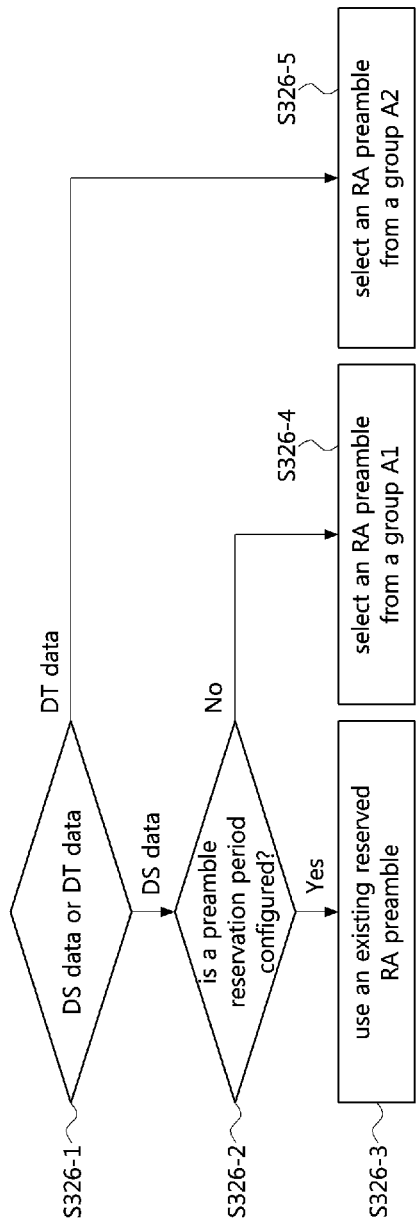
FIG. 6 is a sequence chart illustrating a first exemplary embodiment of detailed operations of the step S326 in the 2-step random access procedure.

FIG. 6 is a sequence chart illustrating a first exemplary embodiment of detailed operations of the step S326 in the 2-step random access procedure.

Referring to FIG. 6, the terminal may determine the type of data to be transmitted as DS data or DT data (S326-1). The terminal may determine the type of data based on QoS requirements (e.g., URLLC requirements). For example, the terminal may determine data having high QoS requirements as DS data, and may determine data having low QoS requirements as DT data. When the type of data to be transmitted is determined to be DT data, the terminal may select an RA preamble from the group A2 (S326-5). The RA preamble may be randomly selected within the group A2.

When the type of data to be transmitted is determined to be DS data, the terminal may identify whether a preamble reservation period is configured (S326-2). The preamble reservation period may be indicated by CB_preamble reservation period included in the RACH configuration information. When the preamble reservation period is configured, the terminal may use the existing reserved RA preamble (S326-3). The existing reserved RA preamble may belong to the group A1. The existing reserved RA preamble may be an RA preamble reserved in advance through the random access procedure between the terminal and the base station. When a preamble reservation period is configured, a timing at which the MsgA including the RA preamble determined in the step S326 is transmitted may be within the preamble reservation period. When a preamble reservation period is not configured, the terminal may select an RA preamble from the group A1 (S326-4). The RA preamble may be randomly selected from the group A1. When a preamble reservation period is not configured, the timing at which the MsgA including the RA preamble determined in the step S326 is transmitted may not be within a preamble reservation period.

The terminal may transmit the RA preamble selected in the step S326 on a PRACH (e.g., PRACH occasion), and may transmit the payload of MsgA on a PUSCH (e.g., PUSCH occasion) associated with the selected RA preamble. The base station may receive the RA preamble from the terminal, and may identify a group to which the received RA preamble belongs. When the received RA preamble belongs to the group A1, and a preamble reservation period is configured (e.g., when the RA preamble belonging to the group A1 is received in the preamble reservation period), the base station may determine that the DS data is transmitted through the random access procedure. In this case, the base station may perform a monitoring operation on the PUSCH associated with the RA preamble in order to receive the DS data. The base station may not transmit a MsgB, which is a response to the MsgA, to the terminal. Alternatively, the base station may transmit a HARQ response for the DS data included in the payload of MsgA to the terminal. The HARQ response may be included in the MsgB, and the MsgB including the HARQ response may be transmitted to the terminal. The MsgB including the HARQ response may be a MsgB including a reservationRAR, which will be described later.

When the received RA preamble belongs to the group A1, and a preamble reservation period is not configured (e.g., when the RA preamble belonging to the group A1 is received outside the preamble reservation period), the base station may determine reservation of an RA preamble for DS data is required. Accordingly, the base station may generate an MsgB including a reservationRAR for reservation of an RA preamble, and may transmit the MsgB to the terminal.

The reservationRAR may include at least one of a preamble reservation (PR) field indicating whether an RA preamble is reserved or not, a transmit power control (TPC) field for controlling a transmission power, a HARQ timing field indicating a transmission timing of a HARQ response, a PUCCH resource field indicating a resource for transmission of the HARQ response, and a timing advance (TA) field used for uplink timing adjustment. The PR field set to 0 may indicate that an RA preamble for transmission of DS data is not reserved. In addition, the PR field set to 0 may indicate that a preamble reservation period is not configured (e.g., activated). The PR field set to 1 may indicate that an RA preamble for transmission of DS data is reserved. In addition, the PR field set to 1 may indicate that a preamble reservation period is configured (e.g., activated).

In addition, the reservationRAR may further include other field(s) in addition to the above-described fields. For example, the reservationRAR may further include a period field indicating a preamble reservation period in which the reserved RA preamble is used. The preamble reservation period indicated by the period field may be a CB_preamble reservation period. The preamble reservation period may start after a time offset from a reception time (e.g., a reception start time or a reception end time) of the MsgB. A field indicating the time offset may be included in the reservationRAR. Alternatively, information indicating the time offset may be included in the RACH configuration information.

Figure 7A:
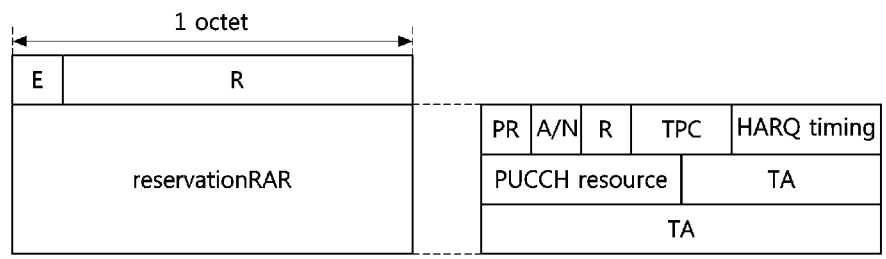
FIG. 7A is a block diagram illustrating a first exemplary embodiment of a MsgB including a reservationRAR.

FIG. 7A is a block diagram illustrating a first exemplary embodiment of a MsgB including a reservationRAR.

Referring to FIG. 7A, the reservationRAR may include a PR field, an A/N field, a reserved (R) field, a TPC field, a HARQ timing field, a PUCCH resource field, and a TA field. The A/N field may include a HARQ response according to a decoding result of uplink data (e.g., PUSCH). The A/N field may indicate acknowledgment (ACK) or negative ACK (NACK). The A/N field set to 0 may indicate a NACK, and the A/N field set to 1 may indicate an ACK. The size of each field included in the reservationRAR may be configured variously.

Figure 7B:
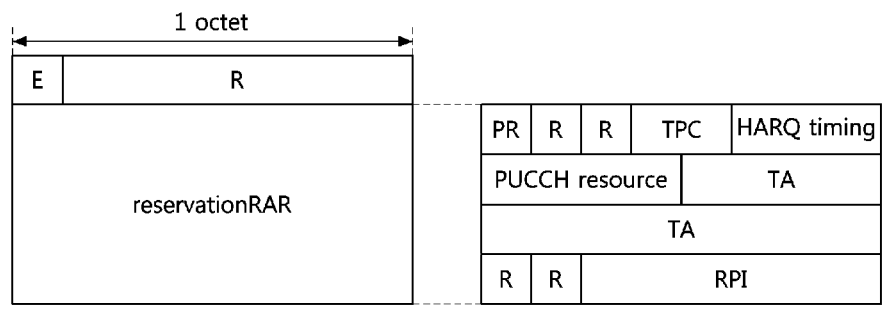
FIG. 7B is a block diagram illustrating a second exemplary embodiment of a MsgB including a reservationRAR.

FIG. 7B is a block diagram illustrating a second exemplary embodiment of a MsgB including a reservationRAR.

Referring to FIG. 7B, the reservationRAR may include a PR field, an R field, a TPC field, a HARQ timing field, a PUCCH resource field, a TA field, and a reserved preamble index (RPI) field. The RPI field may indicate the index of the reserved RA preamble. The RPI field may indicate the index of the RA preamble included in the MsgA transmitted by the terminal. Alternatively, the RPI field may indicate an index of an RA preamble selected by the base station from the group A1. The size of each field included in the reservationRAR may be configured variously.

Meanwhile, a procedure after the MsgA for RA preamble reservation is transmitted may be performed as follows.

(1) Case #1: When the Base Station does not Detect the RA Preamble of the MsgA

In Case #1, the base station may not be able to transmit a MsgB, which is a response to the MsgA, to the terminal. Therefore, the terminal may not receive the MsgB from the base station within a response window. In this case, the terminal may retransmit the MsgA to the base station after the response window ends.

(2) Case #2: When the Base Station Detects the RA Preamble of the MsgA, but Fails to Decode the Payload of the MsgA In Case #2, the base station may transmit a MsgB including a reservationRAR to the terminal. Here, the PR field of the reservationRAR may be set to 0. That is, the PR field of the reservationRAR may indicate that an RA preamble is not reserved. In this case, the reservationRAR may further include information requesting to transmit the payload of the MsgA in a PUSCH occasion that satisfies high URLLC requirements.

Alternatively, the PR field of the reservationRAR may be set to 1. That is, the PR field of the reservationRAR may indicate that an RA preamble is reserved. In this case, the reservationRAR may further include the RPI field. The RPI field may indicate the index of the RA preamble selected by the base station from the group A1 instead of the RA preamble included in the MsgA. The RA preamble indicated by the RPI field may be associated with a PUSCH occasion that satisfies higher URLLC requirements than a PUSCH occasion associated with the RA preamble included in the MsgA.

(3) Case #3: When the Base Station Detects the RA Preamble of the MsgA and Decodes the Payload of the MsgA In Case #3, when the RA preamble of the MsgA can be reserved, the base station may generate the reservationRAR including the PR field set to 1, and may transmit the MsgB including the generated reservationRAR to the terminal. In addition, the reservationRAR may further include the RPI field indicating the index of the reserved RA preamble.

On the other hand, when the RA preamble of the MsgA cannot be reserved, the base station may generate the reservationRAR including the PR field set to 0, and may transmit the MsgB including the generated reservationRAR to the terminal. Alternatively, when the RA preamble of the MsgA cannot be reserved, the base station may generate a reservationRAR including the PR field set to 1 and the RPI field, and may transmit the MsgB including the generated reservationRAR to the terminal. Here, the RPI field may indicate the index of the RA preamble selected by the base station from the group A1. The RA preamble indicated by the RPI field may be the reservable RA preamble.

On the other hand, the terminal may receive the MsgB including the reservationRAR from the base station, and may operate as follows based on the information element(s) included in the MsgB.

When the PR field included in the reservationRAR is set to 1 and the reservationRAR does not include the RPI field, the terminal may determine that the RA preamble selected by the terminal (e.g., the RA preamble included in the MsgA) is reserved, and transmit DS data by using the reserved RA preamble. The reserved RA preamble may be valid within a preamble reservation period (e.g., a period indicated by CB_preamble_reservation_period). When the preamble reservation period ends, the reservation of the RA preamble may be released. In this case, the terminal may perform the RA preamble reservation procedure for DS data transmission again.

When the PR field included in the reservationRAR is set to 1 and the reservationRAR includes the RPI field, the terminal may determine that the RA preamble indicated by the RPI field included in the reservationRAR is reserved, and use the reserved RA preamble to transmit DS data. The RA preamble indicated by the RPI field may be the RA preamble selected by the terminal (e.g., the RA preamble included in the MsgA) or the RA preamble selected by the base station. The reserved RA preamble may be valid within a preamble reservation period (e.g., a period indicated by CB_preamble_reservation_period). When the preamble reservation period ends, the reservation of the RA preamble may be released. In this case, the terminal may perform the RA preamble reservation procedure for DS data transmission again.

When the PR field included in the reservationRAR is set to 0, the terminal may perform the RA preamble reservation procedure for DS data transmission again. For example, the terminal may select a new RA preamble from the group A1, and may transmit the new RA preamble to the base station on a PRACH.

Figure 8A:
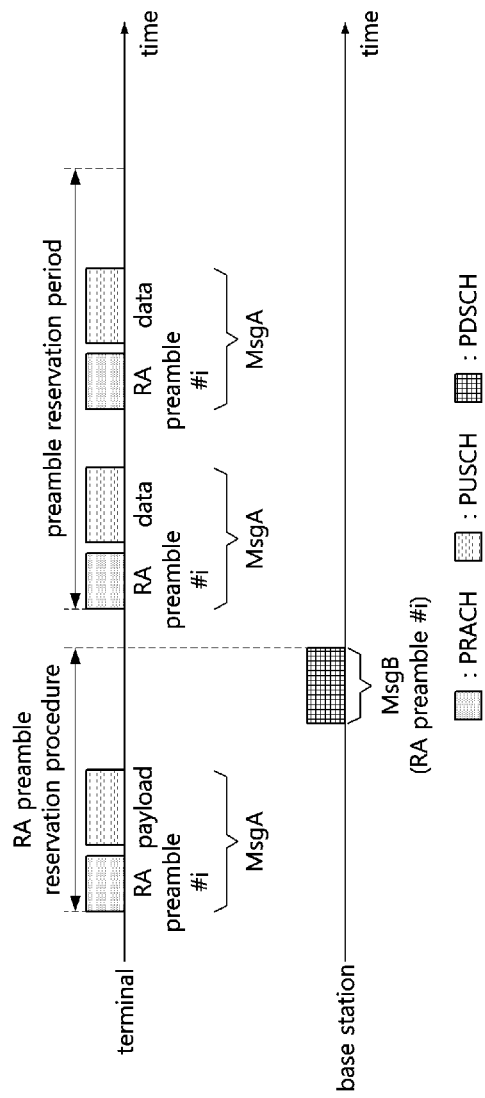
FIG. 8A is a timing diagram illustrating a first exemplary embodiment of a method for transmitting data (e.g., DS data) using a reserved RA preamble.

FIG. 8A is a timing diagram illustrating a first exemplary embodiment of a method for transmitting data (e.g., DS data) using a reserved RA preamble.

Referring to FIG. 8A, a communication system may include a base station and a terminal. The base station may be the base station 110-1, 110-2, 110-3, 120-1, or 120-2 shown in FIG. 1, and the terminal may be the terminal 130-1, 130-2, 130-3, 130-4, 130-5, or 130-6 shown in FIG. 1. Each of the base station and the terminal may be configured identically or similarly to the communication node 200 shown in FIG. 2. In the exemplary embodiment shown in FIG. 8A, a DCI transmission/reception operation for the MsgB is omitted, but the step S330 shown in FIG. 3 may be performed for MsgB transmission/reception.

The terminal may perform a reservation procedure of an RA preamble for data (e.g., DS data) transmission. For example, the terminal may select an RA preamble #i by performing the operations shown in FIGS. 4 and 6. The RA preamble #i may be selected through the step S326-4 shown in FIG. 6. The RA preamble #i may belong to the group A1. The terminal may transmit the RA preamble #i of the MsgA on a PRACH, and may transmit the payload of the MsgA associated with the RA preamble #i on a PUSCH.

The base station may receive the MsgA (e.g., RA preamble #i+payload) from the terminal. When the RA preamble #i belongs to the group A1 and a preamble reservation period is not configured, the base station may determine that reservation of an RA preamble for data (e.g., DS data) transmission is required. If the RA preamble #i can be reserved, the base station may generate a reservationRAR including the PR field set to 1. In addition, the reservationRAR may further include the RPI field indicating the RA preamble #i. The base station may transmit the MsgB including the reservationRAR to the terminal on a PDSCH.

The terminal may receive the MsgB from the base station and may identify the reservationRAR included in the MsgB. When the PR field included in the reservationRAR is set to 1 and the reservationRAR does not include the RPI field, the terminal may determine that the RA preamble #i (e.g., RA preamble #i included in the MsgA) is reserved. Alternatively, when the PR field included in the reservationRAR is set to 1 and the RPI field included in the reservationRAR indicates the RA preamble #i, the terminal may determine that the RA preamble #i is reserved.

When the MsgB including the reservationRAR is received, the terminal may not perform an RRC connection establishment procedure with the base station. Therefore, the operating state of the terminal may not transition to the RRC connected state. That is, the terminal may operate in the RRC idle state or the RRC inactive state.

The terminal (e.g., terminal operating in the RRC idle state or the RRC inactive state) may transmit data using the RA preamble #i reserved within the preamble reservation period. For example, when data (e.g., DS data) occurs, the terminal may transmit the RA preamble #i of the MsgA to the base station on a PRACH, and transmit the payload of the MsgA, which includes the data, to the base station on a PUSCH (e.g., PUSCH occasion) associated with the RA preamble #i.

The base station may receive the MsgA (e.g., RA preamble #i+payload) from the terminal. When the RA preamble #i belongs to the group A1 and a preamble reservation period is configured, the base station may determine that data (e.g., DS data) is transmitted through the random access procedure. In this case, the base station may perform a monitoring operation on the PUSCH associated with the RA preamble #i in order to receive data. The base station may not transmit a MsgB, which is a response to the MsgA, to the terminal. Alternatively, the base station may transmit a HARQ response for the data included in the payload of the MsgA to the terminal. The HARQ response may be included in the MsgB, and the MsgB including the HARQ response may be transmitted to the terminal. Here, the MsgB may include a reservationRAR, and the reservationRAR may include an A/N field indicating the HARQ response.

When the preamble reservation period ends, the reservation of the RA preamble #i may be released. Therefore, the terminal may not perform a data transmission procedure using the RA preamble #i. When data transmission is required, the terminal may perform a reservation procedure for a new RA preamble.

Figure 8B:
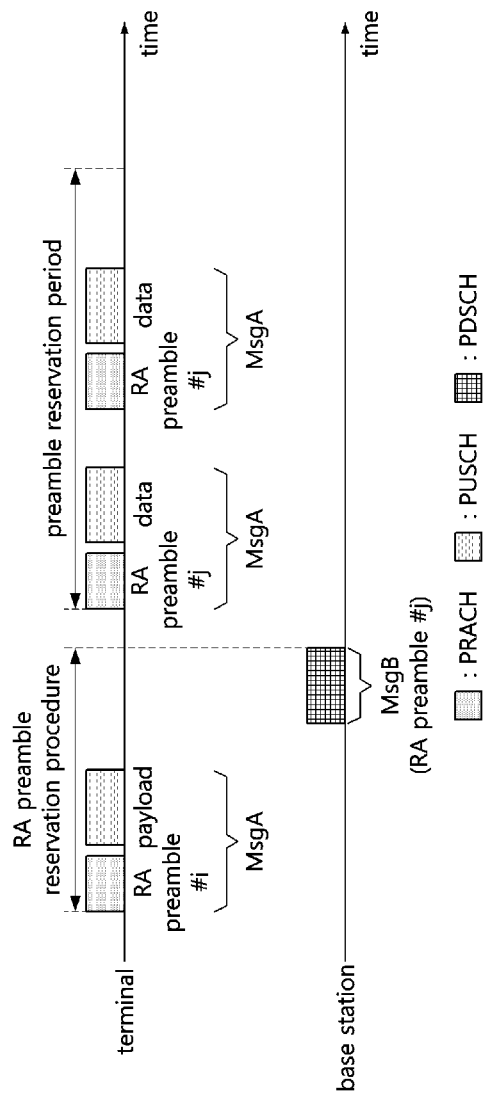
FIG. 8B is a timing diagram illustrating a second exemplary embodiment of a method for transmitting data (e.g., DS data) using a reserved RA preamble.

FIG. 8B is a timing diagram illustrating a second exemplary embodiment of a method for transmitting data (e.g., DS data) using a reserved RA preamble.

Referring to FIG. 8B, a communication system may include a base station and a terminal. The base station may be the base station 110-1, 110-2, 110-3, 120-1, or 120-2 shown in FIG. 1, and the terminal may be the terminal 130-1, 130-2, 130-3, 130-4, 130-5, or 130-6 shown in FIG. 1. Each of the base station and the terminal may be configured identically or similarly to the communication node 200 shown in FIG. 2. In the exemplary embodiment shown in FIG. 8B, a DCI transmission/reception operation for the MsgB is omitted, but the step S330 shown in FIG. 3 may be performed for MsgB transmission/reception.

The terminal may perform a reservation procedure of an RA preamble for data (e.g., DS data) transmission. For example, the terminal may select the RA preamble #i by performing the operations shown in FIGS. 4 and 6. The RA preamble #i may be selected through the step S326-4 shown in FIG. 6. The RA preamble #i may belong to the group A1.

The terminal may transmit the RA preamble #i of the MsgA on a PRACH, and may transmit the payload of the MsgA on a PUSCH associated with the RA preamble #i.

The base station may receive the MsgA (e.g., RA preamble #i+payload) from the terminal. When the RA preamble #i belongs to the group A1 and a preamble reservation period is not configured, the base station may determine that reservation of an RA preamble for data (e.g., DS data) transmission is required. When the RA preamble #i cannot be reserved (e.g., when the RA preamble #i is reserved for another terminal), the base station may select a new RA preamble (e.g., RA preamble #j) from the group A1. The base station may generate a reservationRAR including the PR field set to 1 and the RPI field indicating the RA preamble #j. The base station may transmit a MsgB including the reservationRAR to the terminal on a PDSCH.

The terminal may receive the MsgB from the base station and may identify the reservationRAR included in the MsgB. When the PR field included in the reservationRAR is set to 1, and the RPI field of the reservationRAR indicates the RA preamble #j, the terminal may determine that the RA preamble #j is reserved instead of the RA preamble #i that the terminal has selected. When the MsgB including the reservationRAR is received, the terminal may not perform an RRC connection establishment procedure with the base station. Therefore, the operating state of the terminal may not transition to the RRC connected state. That is, the terminal may operate in the RRC idle state or the RRC inactive state.

The terminal (e.g., terminal operating in the RRC idle state or the RRC inactive state) may transmit data using the RA preamble #j reserved within the preamble reservation period. For example, when data (e.g., DS data) occurs, the terminal may transmit the RA preamble #j of the MsgA to the base station on a PRACH, and transmit the payload of the MsgA, which includes the data, on a PUSCH (e.g., PUSCH occasion) associated with the RA preamble #j.

The base station may receive the MsgA (e.g., RA preamble #j+payload) from the terminal. When the RA preamble #j belongs to the group A1 and a preamble reservation period is configured, the base station may determine that data (e.g., DS data) is transmitted through the random access procedure. In this case, the base station may perform a monitoring operation on the PUSCH associated with the RA preamble #j in order to receive data. The base station may not transmit a MsgB, which is a response to the MsgA, to the terminal. Alternatively, the base station may transmit a HARQ response for the data included in the payload of the MsgA to the terminal. The HARQ response may be included in the MsgB, and the MsgB including the HARQ response may be transmitted to the terminal. Here, the MsgB may include a reservationRAR, and the reservationRAR may include an A/N field indicating the HARQ response.

When the preamble reservation period ends, the reservation of the RA preamble #j may be released. Therefore, the terminal may not perform a data transmission procedure using the RA preamble #j. When data transmission is required, the terminal may perform a reservation procedure for a new RA preamble.

Figure 8C:
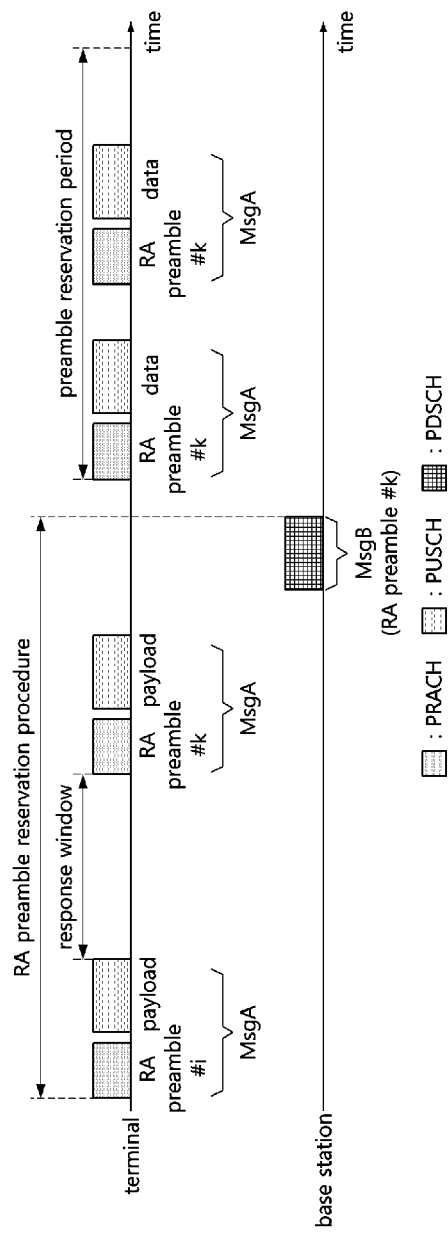
FIG. 8C is a timing diagram illustrating a third exemplary embodiment of a method for transmitting data (e.g., DS data) using a reserved RA preamble.

FIG. 8C is a timing diagram illustrating a third exemplary embodiment of a method for transmitting data (e.g., DS data) using a reserved RA preamble.

Referring to FIG. 8C, a communication system may include a base station and a terminal. The base station may be the base station 110-1, 110-2, 110-3, 120-1, or 120-2 shown in FIG. 1, and the terminal may be the terminal 130-1, 130-2, 130-3, 130-4, 130-5, or 130-6 shown in FIG. 1. Each of the base station and the terminal may be configured identically or similarly to the communication node 200 shown in FIG. 2. In the exemplary embodiment shown in FIG. 8C, a DCI transmission/reception operation for the MsgB is omitted, but the step S330 shown in FIG. 3 may be performed for MsgB transmission/reception.

The terminal may perform a reservation procedure of an RA preamble for data (e.g., DS data) transmission. For example, the terminal may select the RA preamble #i by performing the operations shown in FIGS. 4 and 6. The RA preamble #i may be selected through the step S326-4 shown in FIG. 6. The RA preamble #i may belong to the group A1. The terminal may transmit the RA preamble #i of the MsgA on a PRACH, and may transmit the payload of the MsgA on a PUSCH associated with the RA preamble #i.

The base station may not receive the MsgA (e.g., RA preamble #i+payload) from the terminal. In this case, the base station may not transmit a MsgB, which is a response to the MsgA, to the terminal. The terminal may perform a monitoring operation in the response window to receive the MsgB after transmission of the MsgA. When a MsgB is not received within the response window, the terminal may transmit the MsgA again to the base station. In this case, the terminal may select a new RA preamble #k from the group A1 instead of the RA preamble #i that has failed to transmit. The terminal may transmit the RA preamble #k of the MsgA on a PRACH, and may transmit the payload of the MsgA on a PUSCH associated with the RA preamble #k.

The base station may receive the MsgA (e.g., RA preamble #k+payload) from the terminal. When the RA preamble #k belongs to the group A1 and a preamble reservation period is not configured, the base station may determine that reservation of an RA preamble for transmission of data (e.g., DS data) is required. When the RA preamble #k can be reserved, the base station may generate a reservationRAR including the PR field set to 1. In addition, the reservationRAR may further include the RPI field indicating the RA preamble #k. The base station may transmit a MsgB including the reservationRAR to the terminal on a PDSCH.

The terminal may receive the MsgB from the base station and may identify the reservationRAR included in the MsgB. When the PR field included in the reservationRAR is set to 1 and the reservationRAR does not include the RPI field, the terminal may determine that the RA preamble #k (e.g., RA preamble #k included in the MsgA) selected by the terminal is reserved. Alternatively, when the PR field included in the reservationRAR is set to 1 and the RPI field included in the reservationRAR indicates the RA preamble #k, the terminal may determine that the RA preamble #k is reserved.

When the MsgB including the reservationRAR is received, the terminal may not perform an RRC connection establishment procedure with the base station. Therefore, the operating state of the terminal may not transition to the RRC connected state. That is, the terminal may operate in the RRC idle state or the RRC inactive state.

The terminal (e.g., terminal operating in the RRC idle state or the RRC inactive state) may transmit data using the RA preamble #k reserved within the preamble reservation period. For example, when data (e.g., DS data) occurs, the terminal may transmit the RA preamble #k of the MsgA to the base station on a PRACH, and may transmit the payload of the MsgA including the data to the base station on a PUSCH (e.g., PUSCH occasion) associated with the RA preamble #k.

The base station may receive the MsgA (e.g., RA preamble #k+payload) from the terminal. When the RA preamble #k belongs to the group A1 and a preamble reservation period is configured, the base station may determine that data (e.g., DS data) is transmitted through the random access procedure. In this case, the base station may perform a monitoring operation on the PUSCH associated with the RA preamble #k in order to receive data. The base station may not transmit a MsgB, which is a response to the MsgA, to the terminal. Alternatively, the base station may transmit a HARQ response for the data included in the payload of the MsgA to the terminal. The HARQ response may be included in the MsgB, and the MsgB including the HARQ response may be transmitted to the terminal. Here, the MsgB may include a reservationRAR, and the reservationRAR may include an A/N field indicating the HARQ response.

When the preamble reservation period ends, the reservation of the RA preamble #k may be released. Therefore, the terminal may not perform a data transmission procedure using the RA preamble #k. When data transmission is required, the terminal may perform a reservation procedure for a new RA preamble.

Figure 8D:
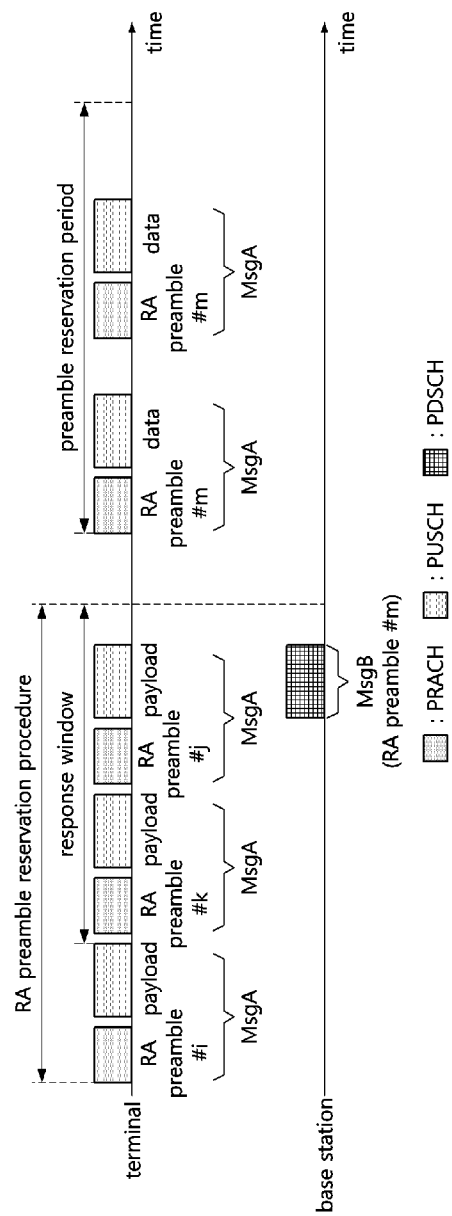
FIG. 8D is a timing diagram illustrating a fourth exemplary embodiment of a method for transmitting data (e.g., DS data) using a reserved RA preamble.

FIG. 8D is a timing diagram illustrating a fourth exemplary embodiment of a method for transmitting data (e.g., DS data) using a reserved RA preamble.

Referring to FIG. 8D, a communication system may include a base station and a terminal. The base station may be the base station 110-1, 110-2, 110-3, 120-1, or 120-2 shown in FIG. 1, and the terminal may be the terminal 130-1, 130-2, 130-3, 130-4, 130-5, or 130-6 shown in FIG. 1. Each of the base station and the terminal may be configured identically or similarly to the communication node 200 shown in FIG. 2. In the exemplary embodiment shown in FIG. 8D, a DCI transmission/reception operation for the MsgB is omitted, but the step S330 shown in FIG. 3 may be performed for MsgB transmission/reception.

The terminal may perform a reservation procedure of an RA preamble for data (e.g., DS data) transmission. For example, the terminal may select the RA preamble #i by performing the operations shown in FIGS. 4 and 6. The RA preamble #i may be selected through the step S326-4 shown in FIG. 6. The RA preamble #i may belong to the group A1. The terminal may transmit the RA preamble #i of the MsgA on a PRACH, and may transmit the payload of the MsgA on a PUSCH associated with the RA preamble #i.

In order to prevent a transmission delay due to retransmission of the MsgA, the terminal may repeatedly transmit the MsgA. For example, the terminal may select the RA preamble #k from the group A1, transmit the RA preamble #k of the MsgA on a PRACH, and transmit the payload of the MsgA on a PUSCH associated with the RA preamble #k. In addition, the terminal may select the RA preamble #j from the group A1, transmit the RA preamble #j of the MsgA on a PRACH, and transmit the payload of the MsgA associated with the RA preamble #j on a PUSCH. The RA preambles of the repeatedly transmitted MsgA(s) may be randomly selected from the group A1, and the payloads of the repeatedly transmitted MsgA(s) may be the same. The MsgA(s) may include information indicating that the MsgA is repeatedly transmitted. The repeated transmission procedure of the MsgA(s) may be performed until a MsgB is received. That is, when the MsgB is received, the terminal may stop the repeated transmission procedure of the MsgA(s).

The base station may receive the MsgA (e.g., 'RA preamble #i+payload' or 'RA preamble #k+payload') from the terminal. When one MsgA among the repeated MsgA(s) is successfully received, the base station may ignore the remaining MsgA(s). When the RA preamble #i or #k belongs to the group A1 and a preamble reservation period is not configured, the base station may determine that reservation of an RA preamble for transmission of data (e.g., DS data) is required. When the RA preamble #i or #k cannot be reserved (e.g., when the RA preamble #i or #k is reserved for another terminal), the base station may select a new RA preamble (e.g., RA preamble #m) from the group A1. The base station may generate a reservationRAR including the PR field set to 1 and the RPI field indicating the RA preamble #m. The base station may transmit a MsgB including the reservationRAR to the terminal on a PDSCH.

The terminal may perform a monitoring operation in the response window to receive the MsgB. When the MsgB is received in the response window, the terminal may stop the repeated transmission procedure of the MsgA(s). The terminal may identify the reservationRAR included in the MsgB received from the base station. When the PR field included in the reservationRAR is set to 1 and the RPI field of the reservationRAR indicates the RA preamble #m, the terminal may determine that the RA preamble #m is reserved instead of the RA preamble that it has selected. When the MsgB including the reservationRAR is received, the terminal may not perform an RRC connection establishment procedure with the base station. Therefore, the operating state of the terminal may not transition to the RRC connected state. That is, the terminal may operate in the RRC idle state or the RRC inactive state.

The terminal (e.g., terminal operating in the RRC idle state or the RRC inactive state) may transmit data using the RA preamble #m reserved within the preamble reservation period. For example, when data (e.g., DS data) occurs, the terminal may transmit the RA preamble #m of the MsgA to the base station on a PRACH, and transmit the payload of the MsgA, which includes the data, on a PUSCH (e.g., PUSCH occasion) associated with the RA preamble #m.

The base station may receive the MsgA (e.g., RA preamble #m+payload) from the terminal. When the RA preamble #m belongs to the group A1 and a preamble reservation period is configured, the base station may determine that data (e.g., DS data) is transmitted through the random access procedure. In this case, the base station may perform a monitoring operation on the PUSCH associated with the RA preamble #m in order to receive data. The base station may not transmit a MsgB, which is a response to the MsgA, to the terminal. Alternatively, the base station may transmit a HARQ response for the data included in the payload of the MsgA to the terminal. The HARQ response may be included in the MsgB, and the MsgB including the HARQ response may be transmitted to the terminal. Here, the MsgB may include a reservationRAR, and the reservationRAR may include an A/N field indicating the HARQ response.

When the preamble reservation period ends, the reservation of the RA preamble #m may be released. Therefore, the terminal may not perform a data transmission procedure using the RA preamble #m. When data transmission is required, the terminal may perform a reservation procedure for a new RA preamble.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a terminal in a communication system, the operation method comprising:
   transmitting a first message A (MsgA) including a random access (RA) preamble #i and a payload to a base station;
   receiving, from the base station, a message B (MsgB) including information indicating an RA preamble #k; and
   transmitting a second MsgA including the RA preamble #k and data to the base station in a preamble reservation period,
   wherein each of i and k is a natural number, and
   wherein when i is equal to k, the data is transmitted on a physical uplink shared channel (PUSCH) occasion associated with the RA preamble #i selected by the terminal.

2. The operation method according to claim 1, wherein the RA preamble #i and the RA preamble #k belong to a group A1 among the group A1 and a group A2, RA preambles belonging to the group A1 are used for transmission of delay-sensitive data, and RA preambles belonging to the group A2 are used for transmission of delay-tolerant data.

3. The operation method according to claim 2, wherein one of configuration information of the group A1 and configuration information of the group A2 is included in random access channel (RACH) configuration information received from the base station, the configuration information of the group A1 indicates one or more of a number and indices of the RA preambles belonging to the group A1, and the configuration information of the group A2 indicates one or more of a number and indices of the RA preambles belonging to the group A2.

4. The operation method according to claim 2, wherein the number of RA preambles belonging to the group A1 is determined based on a ratio of reserved RA preambles.

5. The operation method according to claim 1, wherein the MsgB further includes information indicating that the preamble reservation period is activated.

6. The operation method according to claim 1, wherein when the preamble reservation period ends, the reservation of the RA preamble #k is released.

7. The operation method according to claim 1, wherein the second MsgA is transmitted by the terminal operating in a radio resource control (RRC) idle state or RRC inactive state.

8. An operation method of a terminal in a communication system, the operation method comprising:
   receiving random access channel (RACH) configuration information from a base station;
   transmitting a first message A (MsgA) including a random access (RA) preamble #i selected based on the RACH configuration information and a payload to the base station;
   transmitting a second MsgA including an RA preamble #k selected based on the RACH configuration information and a payload to the base station;
   stopping repeated transmission operations of the MsgA when a message B (MsgB) including information indicating that an RA preamble #j is reserved is received within a response window; and
   transmitting a third MsgA including the RA preamble #j and a payload to the base station for a preamble reservation period associated with the RA preamble #j,
   wherein each of i, k, and j is a natural number, and
   wherein the MsgB further includes information indicating that the preamble reservation period is activated.

9. The operation method according to claim 8, wherein the RACH configuration information includes configuration information of a group A1 to which the RA preamble #i, the RA preamble #k, and the RA preamble #j belong, the configuration information of the group A1 indicates one or more of a number and indices of RA preambles belonging to the group A1, and the RA preambles belonging to the group A1 are used for transmission of delay-sensitive data.

10. The operation method according to claim 9, wherein the number of the RA preambles belonging to the group A1 is determined based on a ratio of reserved RA preambles.

11. The operation method according to claim 8, wherein when i is equal to j, the payload of the third MsgA is transmitted on a physical uplink shared channel (PUSCH) occasion associated with the RA preamble #i selected by the terminal, and when k is equal to j, the payload of the third MsgA is transmitted on a PUSCH occasion associated with the RA preamble #k selected by the terminal.

12. The operation method according to claim 8, wherein when i, k, and j are different from each other, the payload of the third MsgA is transmitted on a PUSCH occasion associated with the RA preamble #j selected by the base station.

13. The operation method according to claim 8, wherein when the preamble reservation period ends, the reservation of the RA preamble #j is released.

14. An operation method of a base station in a communication system, the operation method comprising:
   transmitting radio access channel (RACH) configuration information to a terminal, wherein the RACH configuration information includes configuration information of a group A1, which indicates one or more of a number and indices of RA preambles belonging to the group A1;
   receiving a first message A (MsgA) including a random access (RA) preamble #i and a payload from the terminal, wherein the RA preamble #i belongs to a group A1 consisting of RA preambles used for data transmission;
   transmitting a message B (MsgB) including information indicating the RA preamble #i to the terminal; and
   receiving a second MsgA including the RA preamble #i and data from the terminal in a preamble reservation period,
   wherein i is a natural number.

15. The operation method according to claim 14, wherein the number of the RA preambles belonging to the group A1 is determined based on a ratio of reserved RA preambles.

16. The operation method according to claim 14, wherein the MsgB further includes information indicating that the preamble reservation period is activated, and when the preamble reservation period ends, the reservation of the RA preamble #i is released.

17. The operation method according to claim 14, wherein the second MsgA is received from the terminal operating in a radio resource control (RRC) idle state or RRC inactive state.

* * * * *